INVENTORS
Glen R. Christoffersen
Carmine G. Montanaro, Jr.

United States Patent Office 3,093,222
Patented June 11, 1963

3,093,222
CAPTIVATED FASTENING MEANS
Glen R. Christoffersen, Cupertino, and Carmine G. Montanaro, Jr., San Jose, Calif., assignors, by mesne assignments, to the United States of America as represented by the Secretary of the Navy
Filed Sept. 22, 1960, Ser. No. 57,857
8 Claims. (Cl. 189—36)

The present invention relates generally to fastening means and more particularly to captivated nut and screw assemblies.

A captive nut or bolt can be generally defined as a nut or bolt which is secured to one of the two members being fastened together. Such an expedient is utilized when one of the two members being fastened together is inaccessible when the members are placed together. Since the nut or bolt is prepositioned difficulty of having one member inaccessible is readily overcome. However, situations have occurred wherein each of the two members being fastened are substantially inaccessible; that is, where only a very small tool has access to one member and where the other member is completely inaccessible. Such a condition often occurs, for example, in the mounting of electronic components in a guided or ballistic missile. In this situation the component is often mounted on a bulkhead having its reverse side confined and inaccessible. The electronic component is of such a nature that only a very minimum of space may be sacrified to permit a tool, for example, a screwdriver, to be inserted therethrough. Another requirement frequently encountered is that the component must be located in its final position before the fastening means are engaged. Since each component normally utilizes a plurality of fastening means it is necessary that they not interfere with the positioning of the electronic component.

In addition, these fastening means must withstand high structural stressing and vibration. Another important design factor is that the load path must not be devious as found in many known fastening means. Still further, the assembly must consume a minimum of space.

Accordingly, it is an object of the present invention to provide an improved fastening means in which both the bolt and nut are captivated.

Another object of the present invention is to provide a fastening means which will permit final positioning of one member before the fastening means is engaged.

Still another object of the present invention resides in the provision of a fastening means of the captivated type which will fasten two members together in an environment where only very limited access may be had to the fastening means.

Yet another object of the invention is to provide a fastening means which is simple in construction, consumes a minimum of space, and will withstand high values of structural fatigue, and vibration stresses.

Other objects and many attendant advantages of this invention will be readily appreciated as the same becomes better understood by reference to the following detailed description when considered in connection with the accompanying drawings wherein.

Figure 1:
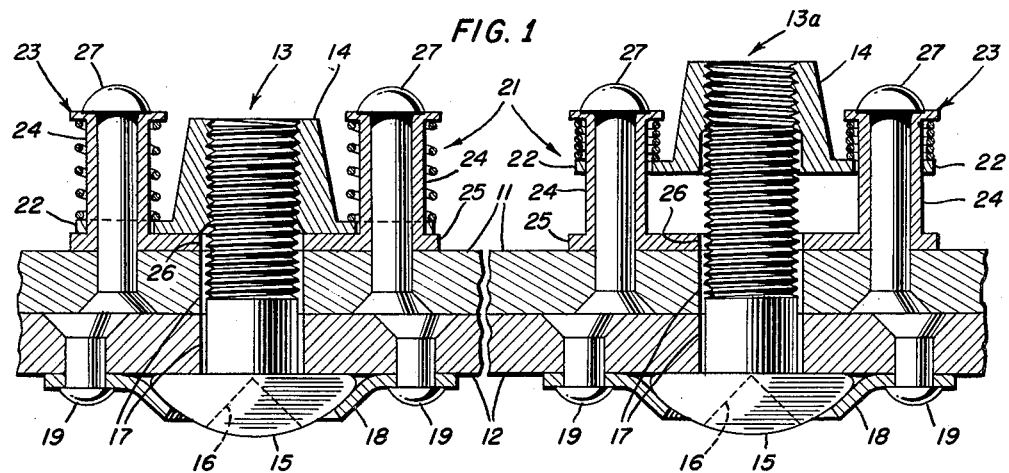
FIG. 1 is a sectional view showing the use of two of the inventive fastening assemblies.
Figure 2:
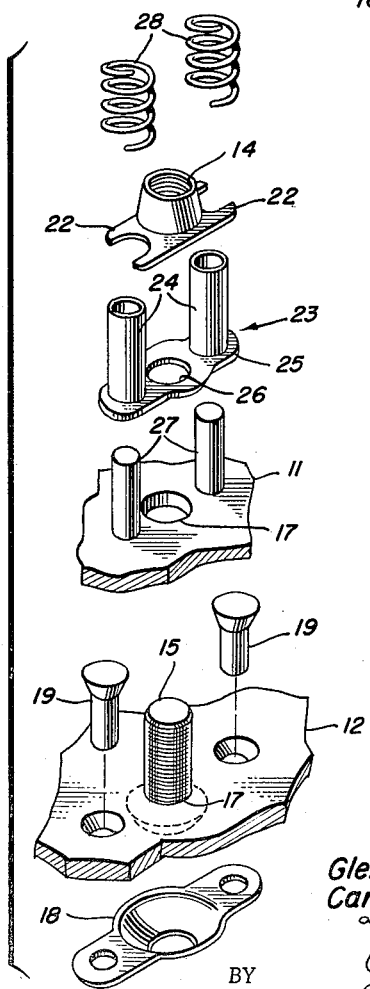
FIG. 2 is an exploded view of the device shown in FIG. 1.

Referring now to the drawings and more particularly to FIGS. 1 and 2 thereof; it will be observed that numerals 11 and 12 indicate two members which are to be fastened rigidly together. Reference character 13 generally illustrates the present invention when the nut 14 and the bolt 15 are threadedly engaged while 13a generally illustrates the invention before the bolt 15 and nut 14 are engaged but when members 11 and 12 are positioned in final relative location.

FIG. 2 which illustrates an exploded view of the fastening means 13 or 13a, will be described simultaneous with the following explanation of the devices illustrated in FIG. 1.

It will be understood that the member 11 could be a flange or a housing of an electronic component while the member 12 could be a bulkhead in a guided or ballistic missile. The captive bolt means 15 is normally positioned in a manner which permits only very limited access thereto when the members 11 and 12 are in their final assembled position. Access to the bolt 15 must be sufficient to permit a tool to engage the groove 16 in the bolt 15 in a manner to impart rotary motion to the bolt. The bolt 15 is prepositioned prior to assembly of members 11 and 12 by inserting it through apertures 17 and securing it to member 12 by means of captivating means or flange 18. This flange is, as seen in FIG. 1, rigidly fastened to member 12 by any suitable fastening means 19.

The captive nut assembly 21 is generally utilized in an environment wherein it is inaccessible during the engagement of the bolt. FIG. 1 illustrates such a nut assembly mounted on member 11. The nut retainer means 23 comprises two tubular members 24 rigidly secured to base plate 25. The base plate 25 has an aperture 26 centrally positioned therein through which the bolt 15 passes when the fastening means is assembled. Conventional fastening means 27 project through the tubular members 24 and rigidly secure the nut retainer means 23 to the member 11 as shown in FIG. 1. Nut means 14 is positioned between the tubular member 24 in a manner to permit its movement to be guided thereby. Spring means 28 are placed between the flanges of the tubular members 24 and the nut means 22 in a manner to urge or bias the nut toward base plate 25.

In operation, it will be observed that the fastening assemblies 13 and 13a do not interfere with the placement of the members in their assembled position. More specifically, the members 11 and 12, when placed in their final assembled position, cause the nut means 14 to be forced away from the base plates 25 as shown by assembly 13a of FIG. 1 before bolt means 15 are rotated in a manner to effect threaded engagement of the nut 14 with the bolt 15.

Spring means 28 urge the nut means 14 into contact with the bolt 15 thereby insuring that the threads will readily engage when the bolt is rotated. Since the members 11 and 12 are already in the final position before the fastening means are engaged the fastening means can be tightened in any desired order or sequence without affecting the positioning of members 11 and 12. That is, the assembly 13 may be threadedly engaged before the assembly 13a is engaged without altering the relative position of members 11 and 12.

Figure 3:
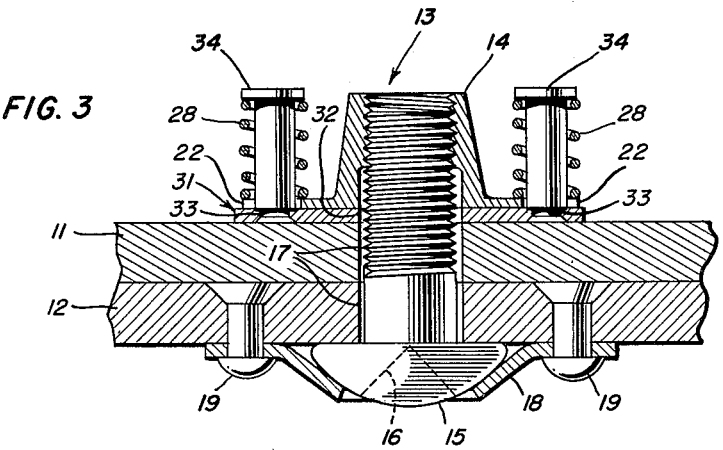
FIG. 3 is an alternate embodiment of the present invention.
Figure 4:
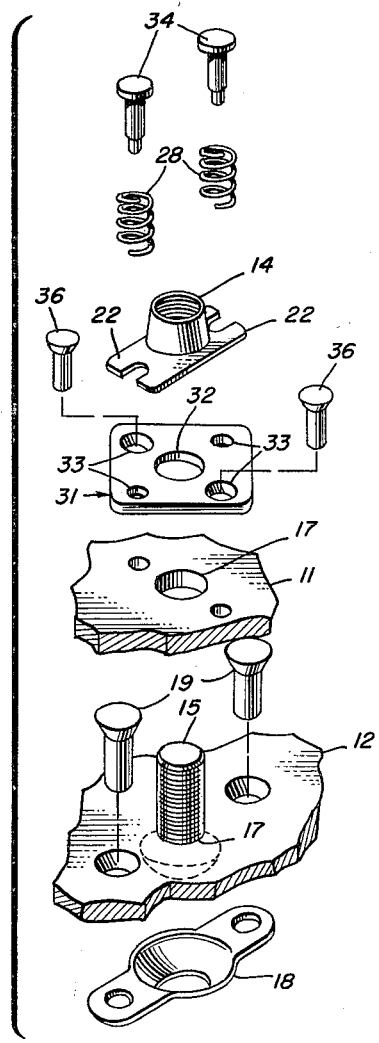
FIG. 4 is an exploded view of the invention as illustrated in FIG. 3.

Another embodiment of the present invention is illustrated in FIGS. 3 and 4 wherein the elements which are identical to those of FIGS. 1 and 2 are designated by the common reference characters. In this embodiment the bolt assembly is exactly the same as that of the embodiment of FIGS. 1 and 2. The nut assembly of this embodiment is substantially identical with that of FIGS. 1 and 2 except that the nut retainer means differs structurally. That is, the nut retainer assembly comprises a base plate 31 having a central aperture 32 positioned therein and four apertures 33 equally spaced about the central aperture 32, as is best illustrated in FIG. 4. Two of the four apertures 33 are adapted to receive nut retainer pins 34 as shown in FIG. 3. The other two apertures 33 are utilized in conjunction with conventional fastening means 36 to rigidly secure the nut retainer assembly to the member 11. The nut means 14 and spring means 28 are positioned on the nut retainer pins 34 in the same manner as they are positioned on the tubular members 24 of the embodiment illustrated in FIGS. 1 and 2. That is, the nut means 14 is not permitted to move except axially within predetermined limits. The spring means 28 urges the nut means toward the base plate to insure immediate engagement of the nut 14 with the bolt 15.

Figure 5:
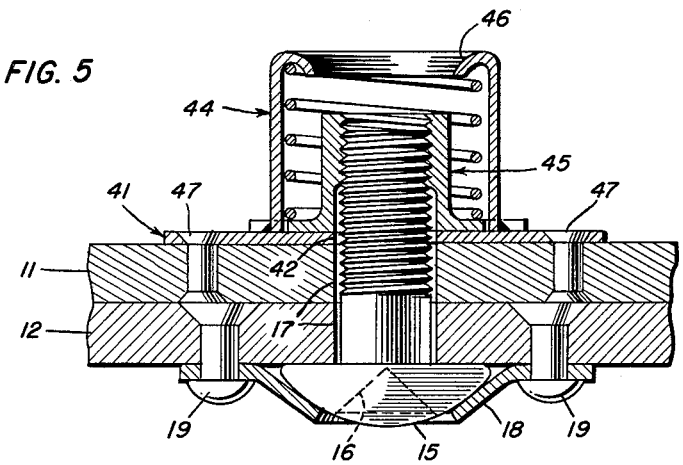
FIG. 5 is a third embodiment of the present invention.
Figure 6:
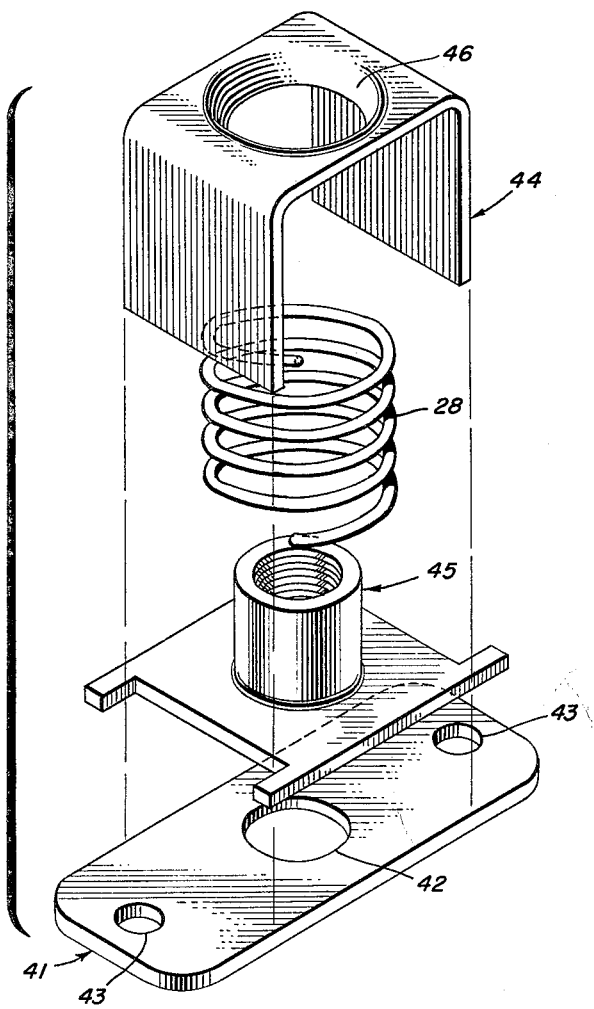
FIG. 6 is an exploded view of a portion of the invention as shown in FIG. 5.

Another embodiment of this invention is shown in FIGS. 5 and 6 wherein base plate 41 has a central aperture 42 and two apertures 43 located in the arms which project from the central portion of the base plate 41. A U-shaped nut retainer means 44 is rigidly mounted on base plate 41 by conventional means, e.g. welding, as shown best in FIG. 5. The nut means 45 is shaped so that when it is assembled, as shown in FIG. 6, its movement will be restricted to limited axial movement. Spring means 28 is positioned between the retainer 44 and the nut means 45 in a manner to urge the nut means toward the base plate 41. Punched hole 46 in the retainer 44 serves to prohibit the lateral movement of spring 28.

The holes or apertures 43 in the base plate 41 are utilized in conjunction with conventional fastening means 47, e.g. rivets, to rigidly secure the nut assembly to member 11.

In operation this embodiment is identical to that of the previously described embodiments. That is, a bolt is inserted into the nut assembly, the nut means 45 is forced against the bias of spring 28 away from base plate 41 in a manner similar to assembly 13a of FIG. 1. Upon rotation of the bolt means, the nut and bolt are threadedly engaged, thereby rigidly securing the members together.

Each of the described embodiments of the present invention permits the final positioning of the members to be fastened together before the nut and bolt are threadedly engaged regardless of the number of fastening means being utilized. These embodiments require only that very limited access be available to the bolt side of the fastening assembly and do not require that the nut assembly be accessible. The described embodiments are simple in construction yet are capable of withstanding a high degree of vibration, fatigue, and structural stressing. The loading path is identical with that of a simple conventional nut and bolt assembly. The volume of space consumed by these embodiments is an absolute minimum thereby permitting their use in confined environments.

Obviously many modifications and variations of the present invention are possible in the light of the above teachings. It is therefore to be understood that within the scope of the appended claims the invention may be practiced otherwise than as specifically described.

What is claimed is:

1. A device for coupling together a first member and a second member having aligned apertures which comprises a bolt element, a nut element threadable upon said bolt element, said nut element having a counterbore, first means on said second member confining said nut element to limited movement along its axis and confining it against material rotation about said axis, said first means including guide means cooperating with said nut element to maintain said nut element in aligned position throughout said limited movement of said nut element, second means acting between said nut element and said first means thereby biasing said nut element yieldingly toward said second member to one limit of its movement, confining means on said first member operable to secure said bolt element to said first member and to limit its relative axial movement while permitting rotational movement thereof whereby when said first and second members are in face-to-face relationship with said apertures aligned said bolt element will pass through said aligned apertures into said counterbore and cause axial displacement of said nut element away from said members against the bias of said second means and subsequent rotation of said bolt element will thread the latter through said nut element and draw said nut element on said bolt element in a direction to couple said first and second members together.

2. The device set forth in claim 1 wherein said first means comprises a base plate having an inverted U-shaped guide means rigidly secured thereto, said nut means having projections which extend laterally from opposite sides thereof, said projections terminating in positions which are matable with said guide means, said second means being interposed between said guide means and said nut element, and third means to operably secure said base plate to said second member.

3. The device set forth in claim 1 wherein said first means comprises a nut retainer assembly which includes a base plate having a central aperture therein which is aligned with said aligned apertures when the device is assembled, cylindrical guide means mounted on opposite sides of said aperture in said base plate, said guide means having flanges on the ends opposite said base plate, said nut element having projections extending laterally from opposite sides thereof, said projections having concave end portions which are of a radius slightly larger than the radius of said cylindrical guide means, said nut element being mounted between said guide means in a manner so that said projections engage said guide means whereby said nut is guided by said guide means, said second means being positioned between said flanges and said projections, and third means operable to rigidly secure said first means to said second member.

4. The device set forth in claim 3 wherein said cylindrical guide means are tubular and said third means comprises fastening means operable to pass through said tubular guide means, said base plate, and said second member.

5. The device set forth in claim 3 wherein said cylindrical guide means are solid pins and said third means comprises fastening means which rigidly secure said base plate and said second member in juxtapositioned relationship.

6. A captive nut assembly for engagement with a bolt element comprising a base plate having a central aperture therein through which said bolt element may pass, guide means mounted on said base plate, a nut element having a central counterbore operably mounted on said guide means, said guide means being operable to prevent rotary motion of said nut element and limiting the axial movement of said nut element within predetermined limits, said guide means cooperating with said nut element in aligned position with said bolt element throughout said axial movement, said guide means comprising two cylindrical projections, and said nut element having two projections extending laterally therefrom, said last mentioned projections having end portions which operably engage said cylindrical guide means, bias means interposed between said nut element and said guide means urging said nut element toward said base plate whereby when said nut assembly has said bolt element inserted through said aperture into said counterbore said nut element is moved axially within said assembly away from said baseplate to one of its predetermined limits, whereby relative rotary motion between said nut element and said bolt element will threadably engage said elements.

7. The nut assembly set forth in claim 6 wherein said cylindrical guide means are hollow tubular shaped elements.

8. The nut assembly set forth in claim 6 wherein said cylindrical guide means are solid pins.

References Cited in the file of this patent
UNITED STATES PATENTS

| | | |
|---|---|---|
| 2,737,222 | Becker | Mar. 6, 1956 |
| 2,767,951 | Cousino | Oct. 23, 1956 |
| 2,907,418 | Hudson | Oct. 6, 1959 |